June 8, 1948.   F. C. MENKING   2,443,050
EQUALIZED TENSION DUAL BLADE SAW APPARATUS
Filed March 10, 1945
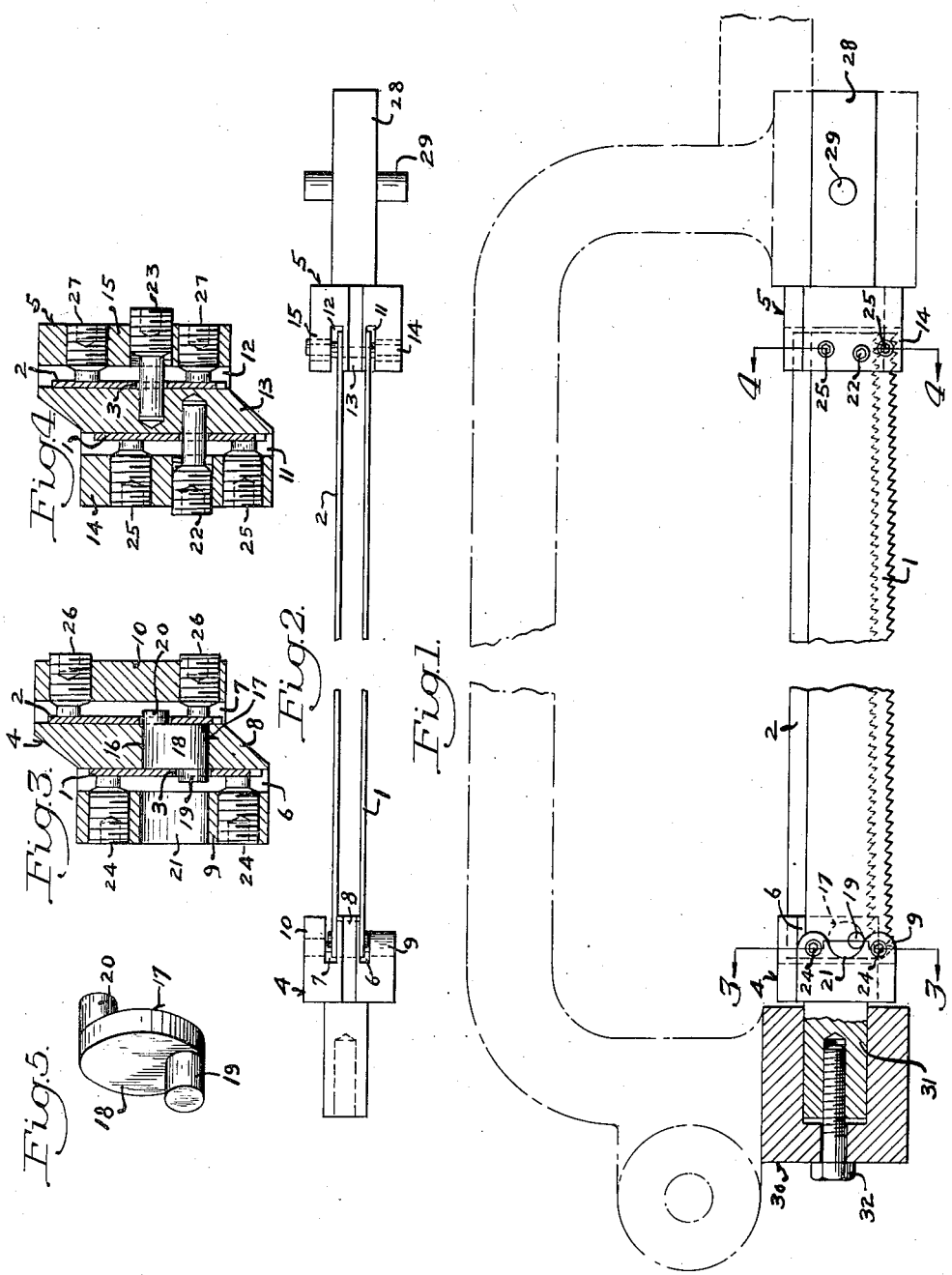
INVENTOR.
FRANK C. MENKING
BY Jas R Snyder
Attorney Patented June 8, 1948

2,443,050

UNITED STATES PATENT OFFICE 2,443,050

EQUALIZED TENSION DUAL BLADE SAW APPARATUS

Frank C. Menking, Pittsburgh, Pa.

Application March 10, 1945, Serial No. 582,056

1 Claim. (Cl. 143—156)

This invention relates to a dual saw apparatus, and while primarily designed and intended for simultaneously cutting off the scrap end and a test piece required for testing metal production, it will be obvious that the device may be employed for any other purposes wherein it is found to be applicable.

Important objects and advantages of the invention are to provide a power-operated apparatus of the character described, which includes a pair of similar saw blades operable for simultaneously effecting two separate saw cutting operations, which embodies novel means for automatically establishing and maintaining uniform and equalized tension of the two blades to assure exact parallel saw cuts, which allow the convenient and ready removal and replacement of the saw blades, which is simple in its construction and arrangement, durable, compact, highly efficient in its use, and comparatively economical in its manufacture and operation.

With the foregoing and other objects in view which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views:

Figure 1 is a side elevational view, partly in cross section, of a dual saw apparatus construction in accordance with the invention.

Figure 2 is a top plan view thereof.

Figure 3 is a sectional view on line 3—3, Figure 1.

Figure 4 is a sectional view on line 4—4, Figure 1.

Figure 5 is a perspective view of the tension equalizing element.

Referring in detail to the drawing 1 and 2 respectively denote a pair of horizontally extending saw blades, which are identical in construction. The saw blades 1 and 2 extend in parallel, spaced relation to each other, with the front saw blade 1 being disposed in advance or at a lower level than the elevated or back saw blade 2. Each of the saw blades is provided with a pair of apertures 3, which latter are disposed adjacent to respective ends thereof.

The saw blades 1 and 2 have their respective ends detachably connected in a pair of end holders, respectively indicated at 4 and 5. The end holders, with the exception of a few structural differences, are generally of similar contour and construction.

The end holder 4 is provided with a pair of spaced, parallel disposed front and back slots, respectively indicated at 6 and 7. The slots 6 and 7 extend vertically through the inner portion of the end holder 4, and have open inner ends. The formation of the slots 6 and 7 provide a common center wall 8, a front wall 9, and a back wall 10. The end holder 5 is likewise provided with a pair of slots 11 and 12, which provide the common center wall 13, the front wall 14, and the back wall 15.

The slots 6 and 7 of the end holder 4, and the slots 11 and 12 of the end holder 5, are provided for the reception of the respective ends of the saw blades 1 and 2, as clearly shown in Figure 2. To conserve material in providing the variation in the relative levels of the saw blades 1 and 2, as above stated, the back wall 10 with the back slot 7 of the end holder 4 are disposed in elevated positions with respect to the positions of the embodied lowered front wall 9 and front slot 6, and the back wall 15 with the back slot 12 of the end holder 5 is likewise elevated relatively to the positions of the associated front wall 14 and slot 11.

The center wall 8, of the end holder 4, is provided with a comparatively large circular opening 16 for the reception of a shiftable equalizing element 17, which latter includes a comparatively heavy disk 18 that is revolubly mounted in said opening 16. The disk 18 carries a pair of fixed connecting pins, respectively indicated at 19 and 20. The connecting pins 19 and 20 are eccentrically offset equi-distant from the axis of the disk 18, and are disposed on respective side faces of the latter. The thickness of the disk 18 is exactly commensurate to the thickness of the center wall 8, whereby the connecting pins 19 and 20 project laterally into respective front and back slots 6 and 7.

The inner end of the front wall 9, of the end holder 4, is provided with a suitable recess 21 for allowing and facilitating the mounting of the equalizing element 17 into the opening 16 in the center wall 8.

The rearward end of the front saw blade 1 extends into the front slot 6 of the end holder 4, and is pivotally engaged by the connnecting pin 19, which extends through the aperture 3 in said blade end. In like manner, the rearward end of the back saw blade 2 extends into the back slot 7 of the end holder 4, and is pivotally engaged by the other connecting pin 20, as clearly illustrated in Figures 2 and 3.

The distance between the centers of the connecting pins 19 and 20 is such that, when said connecting pins are respectively disposed at their maximum low and high positions and the blade ends are connected therewith, the proper level variations of the saw blades are automatically established.

The slots 6 and 7 are of sufficient width to provide ample clearances between the free ends of the connecting pins 19 and 20 and respective walls 9 and 10 to allow and facilitate the engagement of the blade ends on respective connecting pins 19 and 20.

The forward end of the front saw blade 1 extends into the front slot 11 of the holder 5, and is pivotally connected therein by a screw pin 22, which latter is threadedly engaged in the front wall 14, passes through the aperture 3 in said saw blade, and extends into an aperture provided therefor in the center wall 13 of the end holder 5, as clearly shown in Figure 4. In like manner, the forward end of the back saw blade 2 extends into the back slot 12 of the end holder 5, and is pivotally connected therein by a similar screw pin 23, which is threadedly engaged in the back wall 15 of said end holder.

The front saw blade 1 is rigidly held in its vertically edgewise position by a pair of set screws 24, which latter are threadedly mounted in the front wall 9 of the end holder 4, and engage respective corners of the front end of said front blade to force and hold the latter flatly against the center wall 8 of said end holder. The rear end of the front blade 1 is similarly engaged and held by a pair of set screws 25, which are threadedly mounted in the front wall 14 of the end holder 5.

The back saw blade 2 is likewise held in its vertically edgewise position by a pair of set screws 26, which are engaged in the back wall 10 of the end holder 4, and by a pair of set screws 27, which are engaged in the back wall 15 of the end holder 5.

The forward end holder 5 is provided with a forwardly projecting, rectangularly-shaped connecting shank 28, by which said end holder 5 is attached, by means of a connecting pin 29 to a supporting frame 30 of any suitable construction.

The rearward end holder 4 is provided with a rearwardly projecting, rectangularly-shaped connecting shank 31, which is mounted for longitudinal adjustment in the supporting frame 30. A draw bolt 32, revolubly mounted in the frame 30 and being threadedly engaged in the connecting shank 31, is operable for effecting the adjustment of said shank 31 and end holder 4 in the supporting frame 30.

From the foregoing description taken in connection with the accompanying drawing, it will be apparent that, when the draw bolt 32 is operated to adjust the end holder 4 in the frame 30, the equalizing element 17, in the center wall 8 of the said end holder 4, will shift and function automatically to accurately equalize the tension of the saw blades 1 and 2. During such blade tensioning operation, the set screws 24, 25, 26 and 27 are only eased in place. After the tensioning operation, said set screws are set in place to secure respective saw blades in the rigid tensioned position in the end holders 4 and 5.

As herein stated, the prime purpose of the improved dual saw apparatus is to simultaneously cut the scrap end and a test piece from a metal product to be tested. As the front saw blade 1 is positioned and operates in advance of the back saw blade 2, the said scrap end is properly detached from said product prior to the complete severance of the test piece. The thickness of the test piece is, of course, determined and commensurate to the spaced distance between the saw blades 1 and 2.

It has been found in practice that, unless the two saw blades 1 and 2 are accurately equalized in tension, it is impossible to operate same to make two exactly parallel cuts and a test piece of variable thicknesses is invariably produced. The least variation in the distances between the apertures 3 in respective saw blades 1 and 2 is sufficient to vary the tension of the blades, unless such tension is equalized, as set forth. By the use of the improved apparatus, work of uniform thickness is assured, and such work is not required to be reshaped to provide the suitable contour for testing purposes.

The present invention provides a most efficient device of its kind, which may be economically constructed and operated, and successfully employed for the purpose and in the manner herein set forth.

What I claim is:

An equalized tension dual blade saw apparatus of the class described, comprising the combination of a frame structure, a fixed end holder secured at one end of said structure, an adjustable end holder carried at the other end of said structure, each of said holders being provided with a pair of spaced vertically extending parallel disposed slots having open inner ends, a pair of saw blades positioned at varied levels to position one of said blades in advance of the other of said blades, one end of each of said blades extending into the respective slot in said fixed end holder, a pair of screw pins engaged in said fixed end holder and extending through respective inserted blade ends for pivotally connecting the latter to said fixed end holder, an equalizing disk revolubly mounted in said adjustable end holder between said slots in the latter, a pair of fixed connecting pins mounted on said disk, said connecting pins being eccentrically off-set in opposed relation equi-distant from the axis of the disk on respective side faces of said disk and projecting into respective slots of said adjustable end holder, one end of each of said blades extending into a respective slot of said adjustable end holder and being pivotally engaged on a respective connecting pin, an adjusting member mounted in said structure and engaged in said adjustable end holder for adjusting the latter, said disk equalizing the tension of said blades, and a pair of adjustable set screws engaged in a wall of each of the slots in each of said end holders and extending into the respective slot to engage the respective inserted end of the respective one of said blades for rigidly holding the latter flatly against the interposed wall of the respective pair of slots.

FRANK C. MENKING.

REFERENCES CITED

The following references are of record in the file of this patent:

UNITED STATES PATENTS

| Number | Name | Date |
|---|---|---|
| 398,079 | Petry | Feb. 19, 1889 |
| 400,906 | Forsaith | Apr. 9, 1889 |
| 561,957 | Ball | June 6, 1896 |
| 764,374 | Remsen | July 5, 1904 |
| 1,228,728 | White | June 5, 1917 |

FOREIGN PATENTS

| Number | Country | Date |
|---|---|---|
| 59,113 | Germany | Sept. 28, 1891 |
| 212,814 | Great Britain | Mar. 20, 1924 |